(12) United States Patent
Jasrasaria

(10) Patent No.: US 9,400,724 B2
(45) Date of Patent: Jul. 26, 2016

(54) FEDERATING AND PROTECTING MULTIPLE BIG DATA SOURCES COMBINED WITH ENTERPRISE DATA SOURCES FOR BI

(71) Applicant: Dell Products, LP, Round Rock, TX (US)

(72) Inventor: Suresh Kumar Jasrasaria, Boxborough, MA (US)

(73) Assignee: Dell Products, LP, Round Rock, TX (US)

( * ) Notice: Subject to any disclaimer, the term of this patent is extended or adjusted under 35 U.S.C. 154(b) by 145 days.

(21) Appl. No.: 14/289,997

(22) Filed: May 29, 2014

(65) Prior Publication Data

US 2015/0347253 A1    Dec. 3, 2015

(51) Int. Cl.
| G06F 11/00 | (2006.01) |
| --- | --- |
| G06F 11/20 | (2006.01) |
| G06F 3/06 | (2006.01) |
| G06F 11/10 | (2006.01) |
| G06F 11/07 | (2006.01) |

(52) U.S. Cl.
CPC .......... *G06F 11/2094* (2013.01); *G06F 3/0619* (2013.01); *G06F 3/0647* (2013.01); *G06F 3/0685* (2013.01); *G06F 11/0706* (2013.01); *G06F 11/1084* (2013.01); *G06F 11/2071* (2013.01)

(58) Field of Classification Search
CPC ............ G06F 11/2056; G06F 11/2094; G06F 11/1084; G06F 11/1446; G06F 11/1076; G06F 11/1088
See application file for complete search history.

(56) References Cited

U.S. PATENT DOCUMENTS

| 7,941,404 | B2 | 5/2011 | Garimella et al. |
| 2005/0234889 | A1 | 10/2005 | Fox et al. |
| 2007/0067670 | A1* | 3/2007 | Ebsen ................. G06F 11/1092 714/6.32 |
| 2007/0162716 | A1* | 7/2007 | Yagisawa ............ G06F 11/1435 711/162 |
| 2008/0005464 | A1 | 1/2008 | Lubbers et al. |
| 2008/0046805 | A1 | 2/2008 | Shewchenko et al. |
| 2010/0114899 | A1 | 5/2010 | Guha et al. |
| 2010/0232440 | A1* | 9/2010 | Basavaiah ............. H04L 49/357 370/401 |
| 2010/0325206 | A1 | 12/2010 | Dayal et al. |
| 2011/0185268 | A1* | 7/2011 | Matsushige ......... G06F 11/0757 714/819 |
| 2011/0264949 | A1* | 10/2011 | Ikeuchi ............... G06F 11/1076 714/6.22 |
| 2012/0078848 | A1* | 3/2012 | Jennas, II .......... G06F 17/30215 707/649 |

(Continued)

OTHER PUBLICATIONS

Technical Report, "Dell EqualLogic Auto-Snapshot Manager Microsoft Edition Version 4.0 with Microsoft Server 2008 R2 Hyper-V"—Jan. 2012.

*Primary Examiner* — Yolanda L Wilson
(74) *Attorney, Agent, or Firm* — Hamilton, Brook, Smith & Reynolds, P.C.

(57) ABSTRACT

In an embodiment, a method provides first and second storage pools having a plurality of corresponding storage blocks to a storage solution. The method monitors each storage block of the first plurality for an indication of failure by either (a) simultaneously writing a same data to a storage block of the first plurality and a corresponding storage block of the second plurality and, if writing the same data to the corresponding storage block of the second plurality completes before writing the same data to the storage block of the first plurality, indicating the first plurality of storage to be failed or (b) employing an internal procedure of the storage solution. The method, upon determining the indication, replaces the storage block with an unused storage block from a plurality of backup storage blocks or declaring the entire storage solution at a lower performance level.

20 Claims, 6 Drawing Sheets

(56) References Cited

U.S. PATENT DOCUMENTS

| | | | | |
|---|---|---|---|---|
| 2012/0089867 A1* | 4/2012 | Bartlett | ............... | G06F 11/2092 714/6.22 |
| 2012/0166724 A1* | 6/2012 | Smith | ................. | G06F 11/1076 711/114 |
| 2013/0117515 A1* | 5/2013 | Ashmore | ................ | G06F 12/16 711/162 |
| 2013/0151770 A1* | 6/2013 | Hara | ..................... | G06F 3/0632 711/114 |
| 2013/0346794 A1* | 12/2013 | Bartlett | ............... | G06F 11/2094 714/6.21 |
| 2014/0019813 A1* | 1/2014 | McLean | ............ | G06F 17/30575 714/47.3 |
| 2015/0169411 A1* | 6/2015 | Kalman | ................ | G06F 11/203 714/4.12 |

* cited by examiner

US 9,400,724 B2

FEDERATING AND PROTECTING MULTIPLE BIG DATA SOURCES COMBINED WITH ENTERPRISE DATA SOURCES FOR BI

BACKGROUND

Processing Big Data can use a divide and conquer approach. A system can processor can gather Big Data from various sources (e.g., the Internet) and store the data in local memory, local drives, or a local direct access storage device. A system can divide Big Data and multiple processor or devices work on a portion of the Big Data. If using a divide and conquer approach, it is ideal for the data to be closest so the processor.

SUMMARY

In an embodiment, a method of storing data includes providing a first pool of storage having a plurality of storage blocks to a storage solution and providing a second pool of storage having a plurality of storage blocks to the storage solution. Each of the second plurality of storage blocks can correspond to one or more of the first plurality of storage blocks. Each storage block can be a device or a field replaceable unit (FRU). The method can further include monitoring each of the first plurality of storage blocks for an indication of failure by either (a) simultaneously writing a same data to a particular storage block of the first plurality and a corresponding particular storage block of the second plurality and, if writing the same data to the corresponding particular storage block of the second plurality completes before writing the same data to the particular storage block of the first plurality, indicating the first pool of storage to be failed or (b) employing an internal procedure of the storage solution. The method can further include, upon determining an indication of failure of a particular storage block, replacing the particular storage block with an unused storage block from a plurality of backup storage blocks or declaring the entire storage solution at a lower performance level.

In another embodiment, the first plurality of storage blocks includes storage devices with a faster potential top speed relative to the second plurality of storage devices with a slower potential top speed. In another embodiment, the first plurality of storage block includes storage devices with a smaller capacity than the second plurality of storage devices with a larger capacity. The devices can be a circuit board or a solid state drive (SSD) or hard disk drive (HDD) having rotating media. Silicon chips can be placed on a circuit board, which is called a field replaceable unit (FRU) or a storage device. Hybrid drives have a flash storage pool including multiple circuit boards (FRUs or devices) and spinning media storage pool having multiple magnetic media platters (FRUs or devices). In another embodiment, the first plurality of storage blocks includes solid state drives and the second plurality of storage blocks include magnetic hard disk drives.

In another embodiment, the method includes cancelling a write command of the same data to the particular storage block upon completion of writing the same data to either the particular storage block of the first plurality or the particular storage block of the second plurality.

In another embodiment, the internal process compares a recorded write time for a particular write to an expected average or minimum write time.

In another embodiment, data stored on the first plurality of storage blocks is a snapshot backup copy. Data stored on the first plurality of storage blocks can also represent a stream of big data gathered from a plurality of sources.

In another embodiment, the method can include, upon writing the data to the particular storage block of the first plurality or the corresponding particular storage device of the second plurality, copying the data to at least one additional storage area network (SAN).

In another embodiment, a system for storing data in a storage solution having multiple storage pools can include a first pool of storage having a plurality of storage blocks and a second pool of storage having a plurality of storage blocks to the storage solution. Each of the second plurality of storage blocks can correspond to one or more of the first plurality of storage blocks. Each storage block can be a device or a field replaceable unit (FRU). The system can further include a failure notification module configured to monitor each of the first plurality of storage blocks for an indication of failure by either (a) simultaneously writing a same data to a particular storage block of the first plurality and a corresponding particular storage block of the second plurality and, if writing the same data to the corresponding particular storage block of the second plurality completes before writing the same data to the particular storage block of the first plurality, indicating the first pool of storage to be failed or (b) employing an internal procedure of the storage solution. The system can further include a device replacement module configured to, upon determining an indication of failure of a particular storage block, replace the particular storage block with an unused storage block from a plurality of backup storage blocks or declaring the entire storage solution at a lower performance level.

In another embodiment, a non-transitory computer-readable medium can be configured to store instructions for storing data in a storage solution comprising of multiple storage pools. The instructions, when loaded and executed by a processor, can cause the processor to provide a first pool of storage having a plurality of storage blocks to a storage solution and provide a second pool of storage having a plurality of storage blocks to the storage solution. Each of the second plurality of storage blocks can correspond to one or more of the first plurality of storage blocks. Each storage block can be a device or a field replaceable unit (FRU). The instructions can further cause the processor to monitor each of the first plurality of storage blocks for an indication of failure by at least one of (a) simultaneously writing a same data to a particular storage block of the first plurality and a corresponding particular storage block of the second plurality and, if writing the same data to the corresponding particular storage block of the second plurality completes before writing the same data to the particular storage block of the first plurality, indicating the first pool of storage to be failed or (b) employing an internal procedure of the storage solution. The instructions can further cause the processor to, upon determining an indication of failure of a particular storage block, replace the particular storage block with an unused storage block from a plurality of backup storage blocks or declaring the entire storage solution at a lower performance level.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

Figure 1:
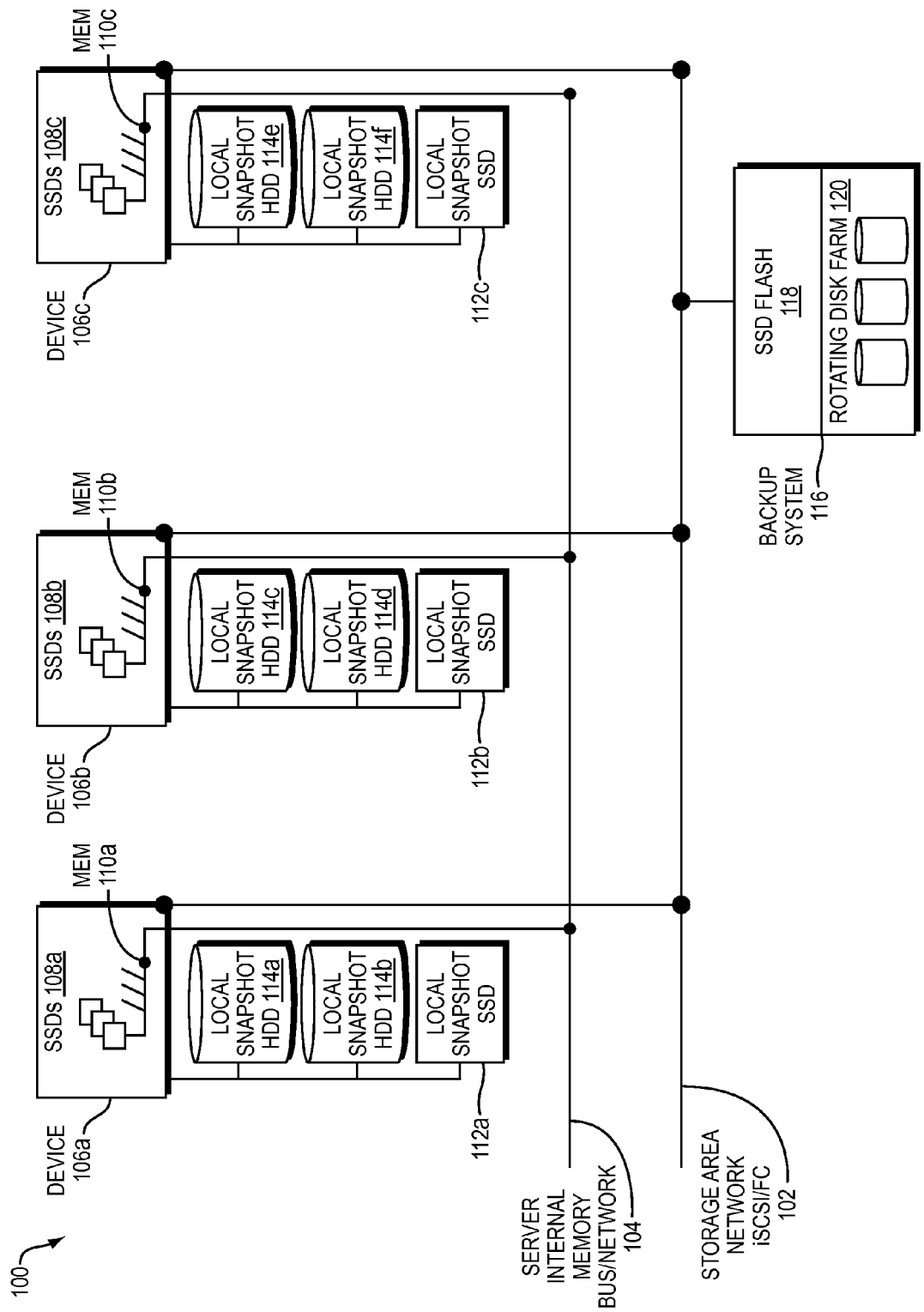
FIG. 1 is a block diagram illustrating an example embodiment of the present invention.

A description of example embodiments of the invention follows.

Systems need to process Big Data, Fast Data, and Little Data. Fast Data is data about conditions that are changing rapidly (e.g., a high data velocity). An example of Fast Data is data collected from cars on the road in the moments before a car crash. Little Data is data that does not necessarily change fast, but is applied to a portion of the Big Data and Fast Data. An example of Little Data can be the rules of road in a location where/near a car crash occurred.

When processing Big Data, there typically does not use a Storage Area Network (SAN). In addition to retrieving data from one source, the system can gather data from multiple sources and federate the data. The system federates the data by correlating the data to a common variable. For example, in a Big Data application that is analyzing data for insider trading, the system may gather data from stock markets (Big Data and Fast Data), social media (Big Data and Fast Data), and individual trades (Little Data).

After collecting the data, the data needs to be saved and protected, for example, to analyze later during a litigation or other analysis. To do so, the system takes a snapshot and transfers the snapshot to the SAN. Then, the system moves the snapshot to a remote SAN for disaster recovery for further redundancy. Each device can create a snapshot for its own computer memory. The device then creates new snapshots capturing state changes to its local SSD. Then, the device copies the changes to the SAN, in effect creating an incremental backup on the SAN.

To collect data in this context, fast storage media, such as solid state drives (SSDs) improve performance due to their increased speeds over hard disk drives (HDDs) that use rotating media. Writing to a SSD is different from writing to a rotating HDD. Writing to a SSD first erases blocks as the SSD and then writes new data to free blocks. Each write is written to a pool of freed blocks. Before writing, the SSD therefore locates a free pool of blocks. The speed of the SSD finding a free pool is proportional to the speed of the SSD executing the write request.

An SSD drive typically includes extra cells greater than its total capacity to allow finding a free pool quicker. For example, a SSD drive may have a capacity of 1 GB, but has 2 GB worth of cells. Other capacities and members of cells can be employed, however the SSD is simply configured to allow only 1 GB of the cells to be active at any time. The excess/GB of cells having a total of 2 GB of cells allows for the SSD to find free pools easier, however. In addition, as the SSD gets older, cells of the SSD wear and become unusable. As the cells are retired, an SSD drive with a greater buffer of cells can continue to operate, however starts to slow as it becomes harder to find free pools of cells.

SSD drives come in three grades: (1) multi-level cell (MLC), (2) eMulti-level cell (eMLC), and (3) single-level cell (SLC). MLCs are generally the cheapest and least reliable, SLCs are the most expensive and most reliable, and eMLCs are in between MLCs and SLCs in reliability and price. SLCs have more total cells than MLCs, leading to higher prices, but also higher reliability. MLCs, however, provide higher data density by providing storage of multiple bits per cell. MLCs are cheaper because they require fewer total cells, but are less reliable because the cells have a higher rate of failure.

For mass storage solutions, such as storing snapshots of Big Data, an array of MLCs can be employed. Even though the MLCs are less reliable than eMLCs and SLCs, an embodiment of the present invention can be employed to replace MLCs approaching the end of their life. This is performed by monitoring the SSD write performance, and if it drops below the performance of a traditional HDD, replacing the SSD, while temporarily storing the snapshot on the HDD.

FIG. 1 is a block diagram 100 illustrating an example embodiment of the present invention. Devices 106$a$-$c$ store data to be backed up in a snapshot. Each device 106$a$-$c$ includes one or more solid state drives (SSDs) 108$a$-$c$, respectively, and a respective memory 110$a$-$c$. Each device 106$a$-$c$ is coupled to a server internal memory bus/network 104 and a storage area network (SAN) 102, which can be either iSCSI or Fibre Channel. Each device 106$a$-$c$ is configured to save a snapshot of its respective SSDs 108$a$-$c$ to a respective local snapshot SSD 112$a$-$c$ or local snapshot HDD 114$a$-$f$ coupled to the device 106$a$-$c$.

Upon saving a snapshot locally at either the local snapshot SSD 112$a$-$c$ or the local snapshot HDD 114$a$-$f$, the device 106 $a$-$c$ copies the locally stored snapshot to a backup system 116 over the SAN 102. Copying the snapshot to the backup system 116 allows the device 106$a$-$c$ to store a second snapshot in its local drives 112$a$-$c$ and 114$a$-$f$. The backup system 116 includes a plurality of SSD flash drives 118 and a rotating disk farm 120. Each device 106$a$-$c$ writes its snapshot to one of the SSD flash drives 118.

However, an SSD flash drive begins to slow down as it approaches the end of its life. Therefore, if an SSD flash drive takes a long time to write a snapshot, it should be replaced with a newer flash drive. Therefore, the backup system 116 includes the rotating disk farm 120 to provide a HDD to receive snapshot writes in parallel with the SSD flash drive. If the HDD finishes its write before the SSD flash drive, this is an indication of SSD flash drive failure. The system allocates a new (or different) SSD flash drive, and copies the snapshot from the HDD to the new SSD. The failed flash drive is flagged for removal and subsequent write requests are not directed to it. If the SSD flash drive finishes its write before the HDD, then the backup system 116 can stop the write to the HDD, as it is unnecessary and can free the HDD for another write.

Figure 2:
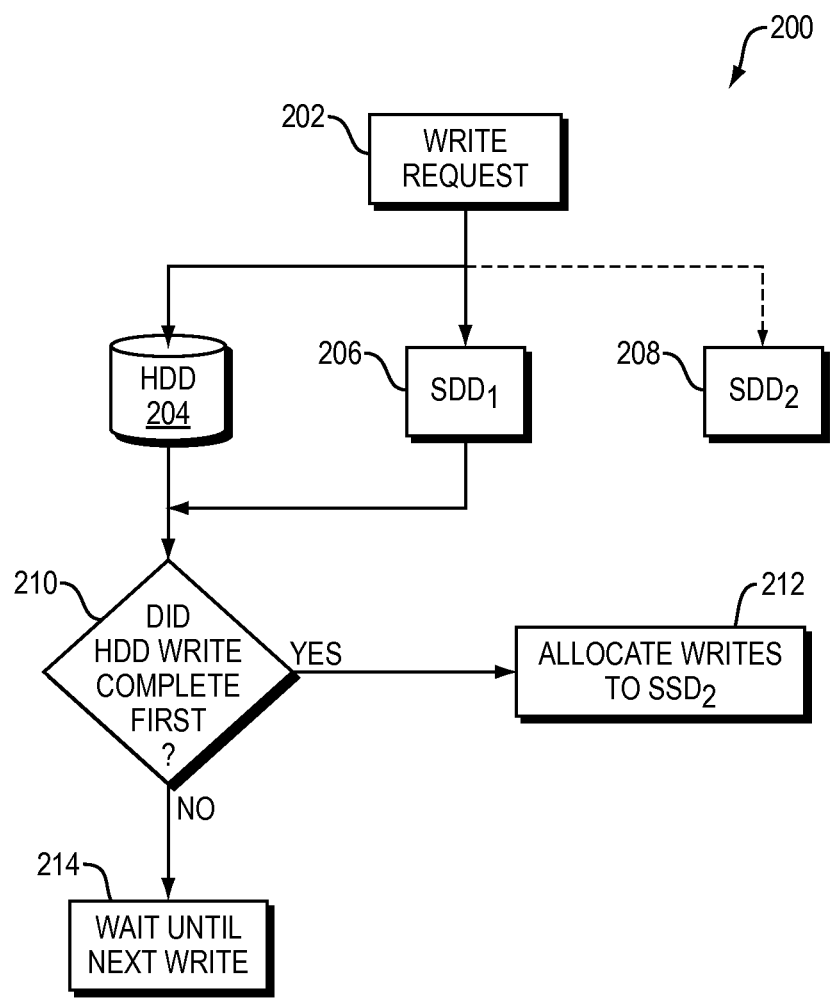
FIG. 2 is a block diagram illustrating an example embodiment of the present invention receiving a write request.

FIG. 2 is a block diagram 200 illustrating an example embodiment of the present invention receiving a write request 202. The write request 202 is directed simultaneously to a HDD 204 and $SDD_1$ 206. The system determines whether the HDD write completed first (210). If so, the system allocates writes to $SSD_2$ 208 (212) and can optionally copy the contents of the HDD 204 to the $SDD_2$ 208. If not, the system waits to receive the next write (214).

Figure 3:
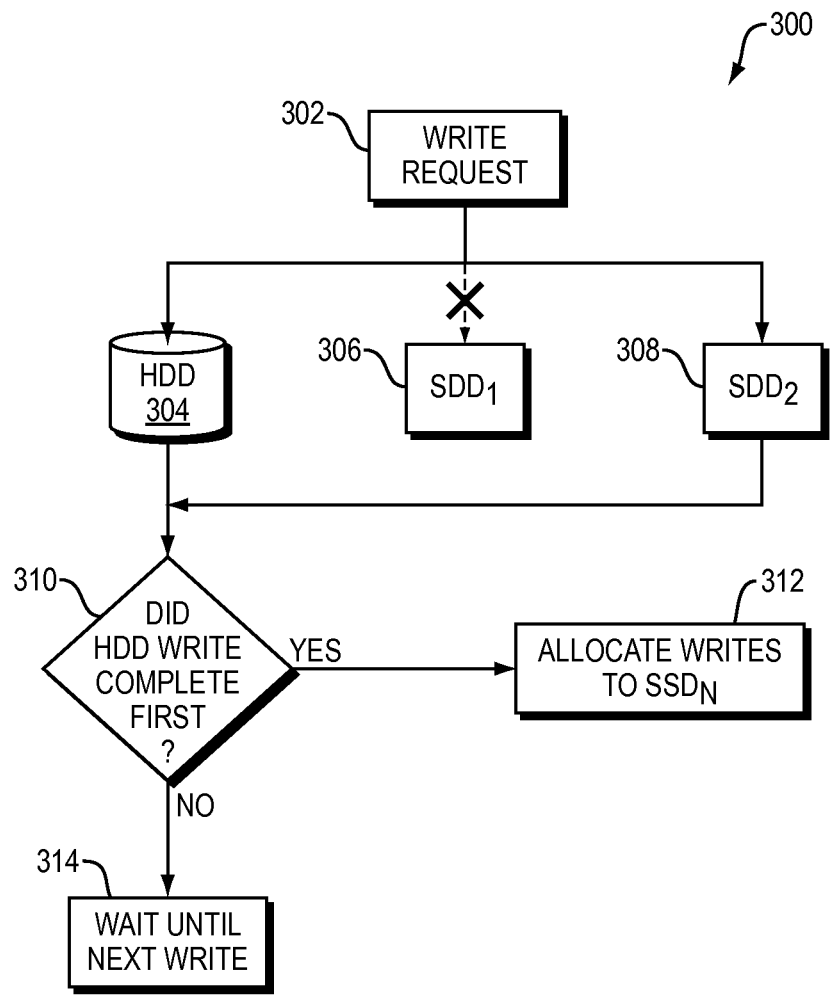
FIG. 3 is a block diagram illustrating an example embodiment of the present invention receiving a next write request.

FIG. 3 is a block diagram 300 illustrating an example embodiment of the present invention receiving a next write request 302. The write request 302 is directed towards HDD 304 and $SDD_2$ 308, as $SDD_1$ 306 is determined to be failed or at its end of life. Therefore, no write is directed to the $SDD_1$ 306. The system determines whether the HDD write completed first (310). If so, the system allocates writes to SSD$_N$ (312) and can optionally copy the contents of the HDD 304 to the SDD$_N$. If not, the system waits to receive the next write (314).

Figure 4:
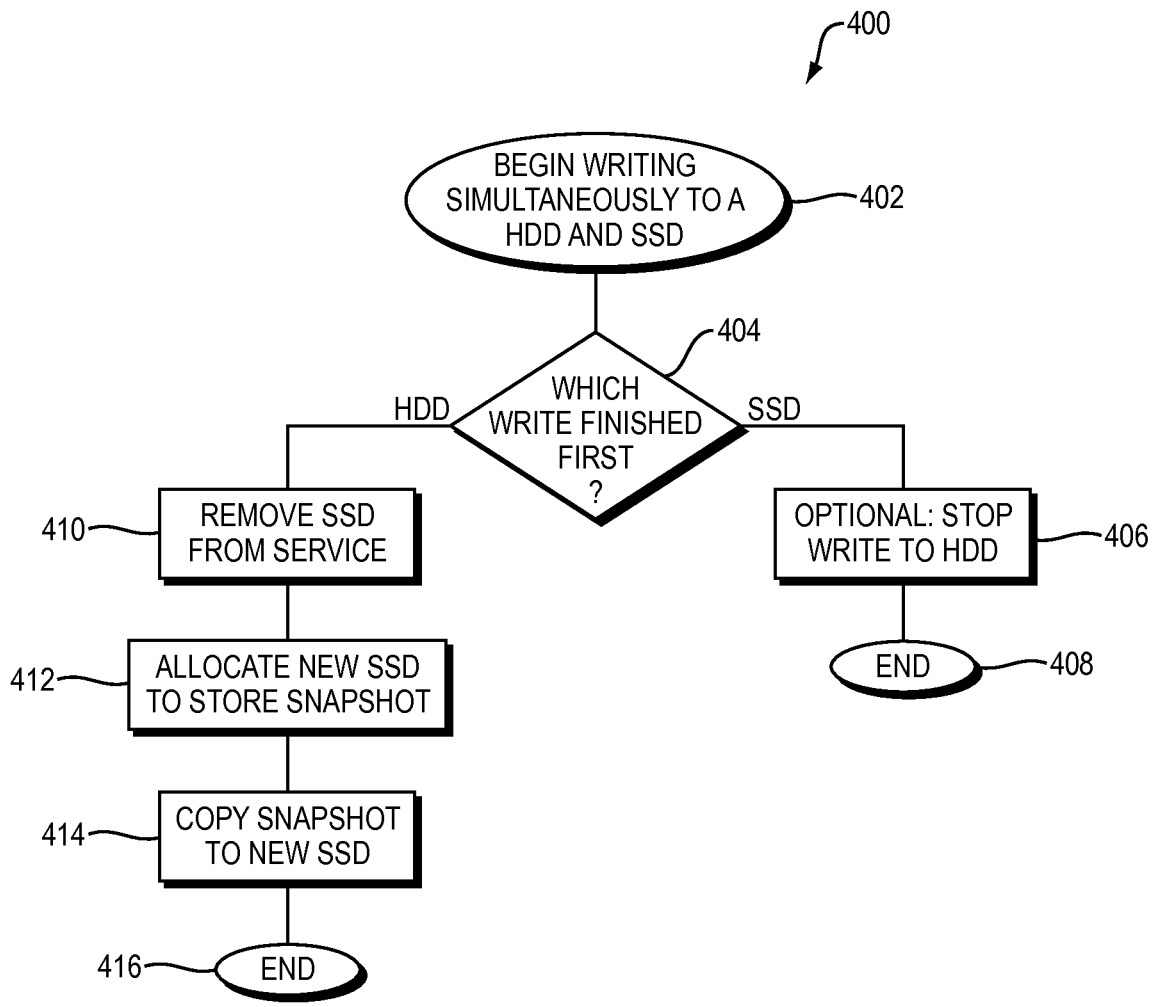
FIG. 4 is a flow diagram illustrating an example embodiment of a process employing the present invention.

FIG. 4 is a flow diagram 400 illustrating an example embodiment of a process employing the present invention. The process begins by writing simultaneously to a HDD and a SSD (402). The process then determines which write finishes first, the write to the HDD or the write to the SSD (404). If the write to the SSD finishes first (404), the process optionally stops the write to the HDD (406), freeing up the HDD for another write. The process then ends (408).

If the write to the HDD finishes first (404), then the process removes the SSD from service (410), either virtually by flagging the SSD or physically by removing or marking for removal the drive from the pool of SSD flash drives. The process then allocates a new SSD to store a snapshot (412). The process then copies the snapshot from the HDD to the newly allocated SSD (414), and then frees the HDD to the HDD pool. The process then ends (416).

Figure 5:
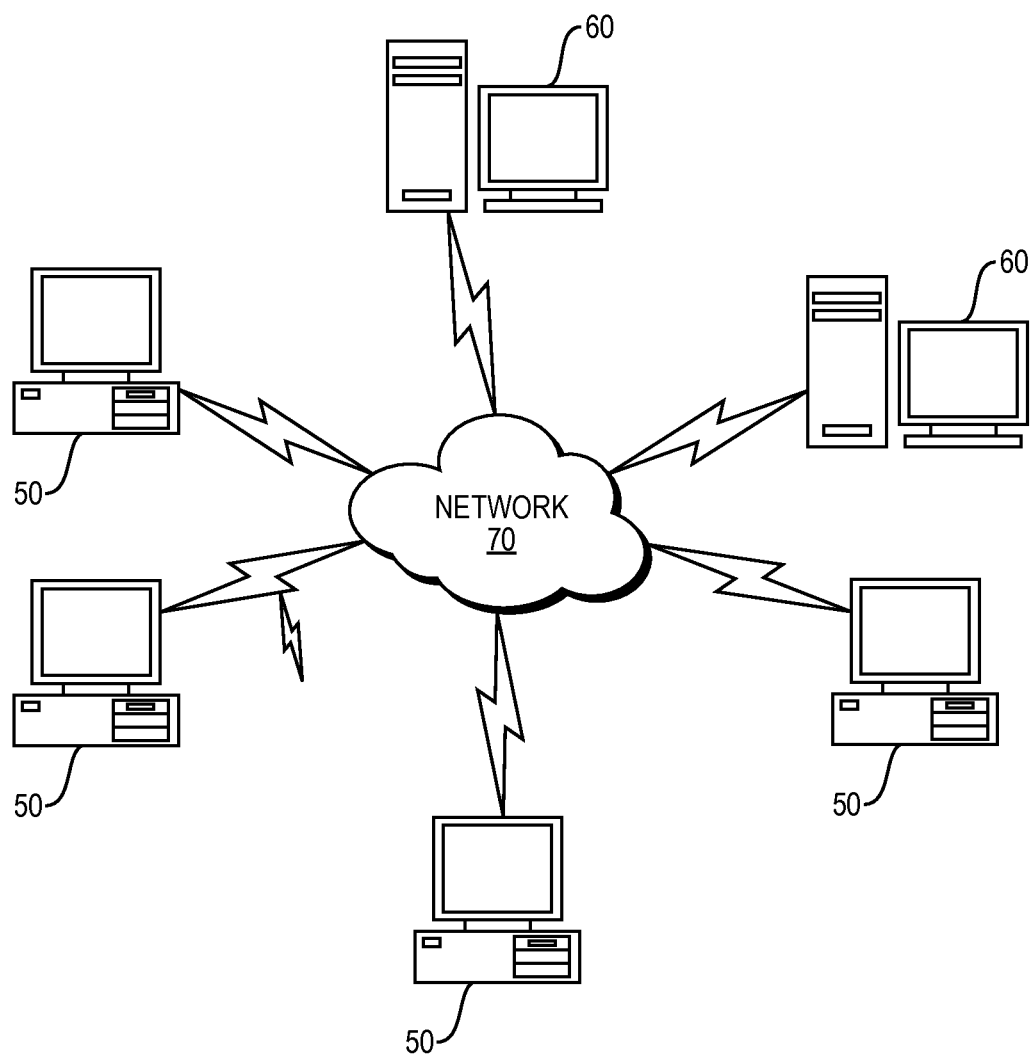
FIG. 5 illustrates a computer network or similar digital processing environment in which embodiments of the present invention may be implemented.

FIG. 5 illustrates a computer network or similar digital processing environment in which embodiments of the present invention may be implemented.

Client computer(s)/devices 50 and server computer(s) 60 provide processing, storage, and input/output devices executing application programs and the like. The client computer(s)/devices 50 can also be linked through communications network 70 to other computing devices, including other client devices/processes 50 and server computer(s) 60. The communications network 70 can be part of a remote access network, a global network (e.g., the Internet), a worldwide collection of computers, local area or wide area networks, and gateways that currently use respective protocols (TCP/IP, Bluetooth®, etc.) to communicate with one another. Other electronic device/computer network architectures are suitable.

Figure 6:
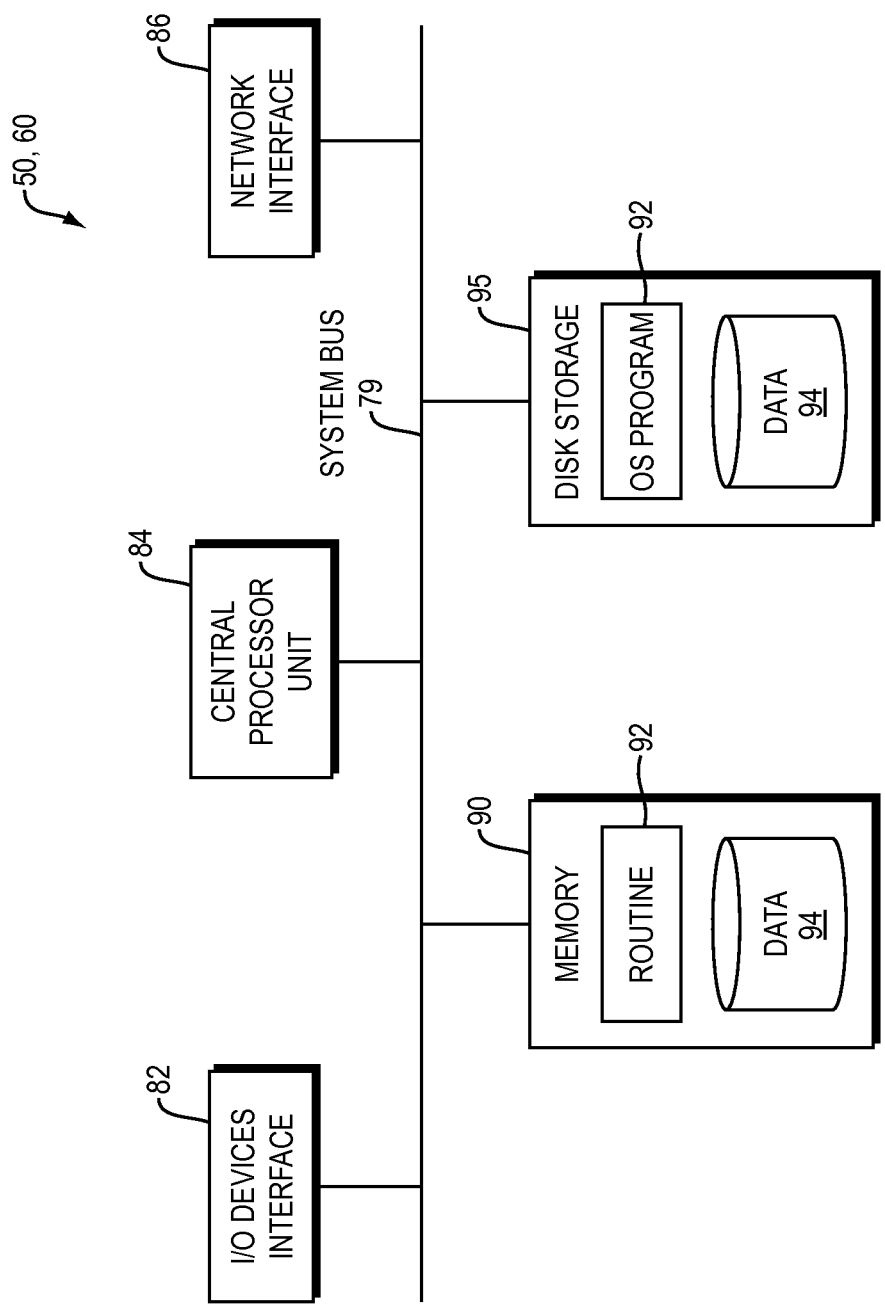
FIG. 6 is a diagram of an example internal structure of a computer (e.g., client processor/device or server computers) in the computer system of FIG. 5.

FIG. 6 is a diagram of an example internal structure of a computer (e.g., client processor/device 50 or server computers 60) in the computer system of FIG. 5 Each computer 50, 60 contains a system bus 79, where a bus is a set of hardware lines used for data transfer among the components of a computer or processing system. The system bus 79 is essentially a shared conduit that connects different elements of a computer system (e.g., processor, disk storage, memory, input/output ports, network ports, etc.) that enables the transfer of information between the elements. Attached to the system bus 79 is an I/O device interface 82 for connecting various input and output devices (e.g., keyboard, mouse, displays, printers, speakers, etc.) to the computer 50, 60. A network interface 86 allows the computer to connect to various other devices attached to a network (e.g., network 70 of FIG. 5). Memory 90 provides volatile storage for computer software instructions 92 and data 94 used to implement an embodiment of the present invention (e.g., selection module, presentation module and labeling module code detailed above). Disk storage 95 provides non-volatile storage for computer software instructions 92 and data 94 used to implement an embodiment of the present invention. A central processor unit 84 is also attached to the system bus 79 and provides for the execution of computer instructions. The disk storage 95 or memory 90 can provide storage for a database. Embodiments of a database can include a SQL database, text file, or other organized collection of data.

In one embodiment, the processor routines 92 and data 94 are a computer program product (generally referenced 92), including a non-transitory computer-readable medium (e.g., a removable storage medium such as one or more DVD-ROM's, CD-ROM's, diskettes, tapes, etc.) that provides at least a portion of the software instructions for the invention system. The computer program product 92 can be installed by any suitable software installation procedure, as is well known in the art. In another embodiment, at least a portion of the software instructions may also be downloaded over a cable communication and/or wireless connection.

While this invention has been particularly shown and described with references to example embodiments thereof, it will be understood by those skilled in the art that various changes in form and details may be made therein without departing from the scope of the invention encompassed by the appended claims.

What is claimed is:

1. A method of storing data comprising:
   providing a first pool of storage having a plurality of storage blocks to a storage solution;
   providing a second pool of storage having a plurality of storage blocks to the storage solution, each of the second plurality of storage blocks corresponding to one or more of the first plurality of storage blocks, each storage block being a device or a field replaceable unit (FRU);
   monitoring each of the first plurality of storage blocks for an indication of failure by simultaneously writing a same data to a particular storage block of the first plurality and a corresponding particular storage block of the second plurality and, if writing the same data to the corresponding particular storage block of the second plurality completes before writing the same data to the particular storage block of the first plurality, indicating the first pool of storage to be failed; and
   upon determining an indication of failure of a particular storage block, replacing the particular storage block with an unused storage block from a plurality of backup storage blocks or declaring the entire storage solution at a lower performance level.

2. The method of claim 1, wherein the first plurality of storage blocks includes storage devices with a faster potential top speed relative to the second plurality of storage devices with a slower potential top speed.

3. The method of claim 1, wherein the first plurality of storage block includes storage devices with a smaller capacity than the second plurality of storage devices with a larger capacity.

4. The method of claim 1, wherein the first plurality of storage blocks include solid state drives and the second plurality of storage blocks include magnetic hard disk drives.

5. The method of claim 1, further comprising:
   cancelling a write command of the same data to the particular storage block upon completion of writing the same data to either the particular storage block of the first plurality or the particular storage block of the second plurality.

6. The method of claim 1, further comprising monitoring each of the first plurality of storage blocks for an indication of failure by an internal process of the storage solution comparing a recorded write time for a particular write to an expected average or minimum write time.

7. The method of claim 1, wherein data stored on the first plurality of storage blocks is a snapshot backup copy.

8. The method of claim 1, wherein data stored on the first plurality of storage blocks represents a stream of big data gathered from a plurality of sources.

9. The method of claim 1, further comprising, upon writing the data to the particular storage block of the first plurality or the corresponding particular storage device of the second plurality, copying the data to at least one additional storage area network (SAN).

10. A system for storing data in a storage solution having multiple storage pools, the method comprising:
- a first pool of storage having a plurality of storage blocks;
- a second pool of storage having a plurality of storage blocks to the storage solution, each of the second plurality of storage blocks corresponding to one or more of the first plurality of storage blocks, each storage block being a device or a field replaceable unit (FRU);
- a failure notification module configured to monitor each of the first plurality of storage blocks for an indication of failure by simultaneously writing a same data to a particular storage block of the first plurality and a corresponding particular storage block of the second plurality and, if writing the same data to the corresponding particular storage block of the second plurality completes before writing the same data to the particular storage block of the first plurality, indicating the first pool of storage to be failed; and
- a device replacement module configured to, upon determining an indication of failure of a particular storage block, replace the particular storage block with an unused storage block from a plurality of backup storage blocks or declaring the entire storage solution at a lower performance level.

11. The system of claim 10, wherein the first plurality of storage blocks includes storage devices with a faster potential top speed relative to the second plurality of storage devices with a slower potential top speed.

12. The system of claim 10, wherein the first plurality of storage block includes storage devices with a smaller capacity than the second plurality of storage devices with a larger capacity.

13. The system of claim 10, wherein the first plurality of storage blocks include solid state drives and the second plurality of storage blocks include magnetic hard disk drives.

14. The system of claim 10, wherein the failure notification module is further configured to cancel a write command of the same data to the particular storage block upon completion of writing the same data to either the particular storage block of the first plurality or the particular storage block of the second plurality.

15. The system of claim 10, wherein the failure notification module further monitors each of the first plurality of storage blocks for an indication of failure via an internal process of the storage solution comparing a recorded write time for a particular write to an expected average or minimum write time.

16. The system of claim 10, wherein data stored on the first plurality of storage blocks is a snapshot backup copy.

17. The system of claim 10, wherein data stored on the first plurality of storage blocks represents a stream of big data gathered from a plurality of sources.

18. The system of claim 10, further comprising, a backup module configured to, upon writing the data to the particular storage block of the first plurality or the corresponding particular storage device of the second plurality, copy the data to at least one additional storage area network (SAN).

19. A non-transitory computer-readable medium configured to store instructions for storing data in a storage solution comprising of multiple storage pools, the instructions, when loaded and executed by a processor, causes the processor to:
- provide a first pool of storage having a plurality of storage blocks to a storage solution;
- provide a second pool of storage having a plurality of storage blocks to the storage solution, each of the second plurality of storage blocks corresponding to one or more of the first plurality of storage blocks, each storage block being a device or a field replaceable unit (FRU);
- monitor each of the first plurality of storage blocks for an indication of failure by simultaneously writing a same data to a particular storage block of the first plurality and a corresponding particular storage block of the second plurality and, if writing the same data to the corresponding particular storage block of the second plurality completes before writing the same data to the particular storage block of the first plurality, indicating the first pool of storage to be failed; and
- upon determining an indication of failure of a particular storage block, replace the particular storage block with an unused storage block from a plurality of backup storage blocks or declaring the entire storage solution at a lower performance level.

20. The non-transitory computer-readable medium of claim 19, wherein the first plurality of storage blocks includes storage devices with a faster potential top speed relative to the second plurality of storage devices with a slower potential top speed.

* * * * *